(12) United States Patent
Beechy et al.

(10) Patent No.: US 9,038,988 B1
(45) Date of Patent: May 26, 2015

(54) VALVE HAVING REDUCED OPERATING FORCE AND ENHANCED THROTTLING CAPABILITY

(75) Inventors: David Beechy, Walnut Creek, OH (US); Kevin Petit, Wooster, OH (US); Nelsimar Vandelli, Wooster, OH (US)

(73) Assignee: Akron Brass Company, Wooster, OH (US)

( * ) Notice: Subject to any disclaimer, the term of this patent is extended or adjusted under 35 U.S.C. 154(b) by 526 days.

(21) Appl. No.: 13/287,039

(22) Filed: Nov. 1, 2011

Related U.S. Application Data (60) Provisional application No. 61/408,942, filed on Nov. 1, 2010, provisional application No. 61/416,350, filed on Nov. 23, 2010.

(51) Int. Cl.
*F16K 5/06* (2006.01)
*F16K 5/10* (2006.01)

(52) U.S. Cl.
CPC .................................. *F16K 5/10* (2013.01)

(58) Field of Classification Search
USPC ........................ 251/315.01, 315.16
See application file for complete search history.

(56) References Cited

U.S. PATENT DOCUMENTS

| | | | |
|---|---|---|---|
| 2,545,220 A | 3/1951 | Wolcott, Jr. | |
| 2,765,142 A | 10/1956 | Ludeman | |
| 3,617,025 A * | 11/1971 | Gerbic et al. | 251/172 |
| 3,689,027 A | 9/1972 | Grenier | |
| 3,722,859 A * | 3/1973 | Murphy et al. | 251/315.01 |
| 3,784,155 A * | 1/1974 | Tomlin | 251/181 |
| 3,817,117 A * | 6/1974 | Kita et al. | 74/462 |
| 4,103,868 A | 8/1978 | Thompson | |
| 4,346,730 A * | 8/1982 | Gardner | 137/375 |
| 4,423,749 A | 1/1984 | Schmitt | |
| 4,542,878 A | 9/1985 | Kulisek | |
| 5,435,521 A | 7/1995 | Jarecki | |
| 5,979,873 A | 11/1999 | Wu | |
| 5,988,220 A * | 11/1999 | Sakaki | 137/625.47 |
| 6,173,940 B1 * | 1/2001 | Kardohely et al. | 251/283 |
| 6,412,756 B1 * | 7/2002 | Hayduk | 251/315.1 |
| 2003/0205685 A1 * | 11/2003 | Whang | 251/209 |
| 2011/0253922 A1 * | 10/2011 | Hughes et al. | 251/315.01 |

* cited by examiner

*Primary Examiner* — John K Fristoe, Jr.
*Assistant Examiner* — Daphne M Barry
(74) *Attorney, Agent, or Firm* — Brouse McDowell; Michael G. Craig; Heather M. Barnes (57) ABSTRACT

A flow control valve element has a generally spherical ball. An inlet is formed in the ball. An outlet is also formed in the ball, the outlet opposing the inlet. A hollowed-out portion extends between the inlet and the outlet. A pair of opposing flats are formed in the ball, the flats each having a first flat portion formed in an external portion of the ball and an opposing second flat portion formed in the hollowed-out portion of the ball.

16 Claims, 8 Drawing Sheets

VALVE HAVING REDUCED OPERATING FORCE AND ENHANCED THROTTLING CAPABILITY

This application claims priority to U.S. provisional application 61/408,942, filed Nov. 1, 2010 and U.S. provisional application 61/416,350, filed Nov. 23, 2010, the entire contents of each application being incorporated herein by reference.

FIELD

The present invention relates generally to valves for controlling the flow of fluids and gases, in particular to ball valves.

BACKGROUND

In flow control valves a specific device is utilized as the flow-controlling element, and may be provided in many different forms. The flow-control element may be directly actuated manually, or by any other suitable indirect or powered means, and is positioned inside the valve so that the flow of fluids and gases (hereafter generally "fluids") can be modulated according to various application-specific requirements. In operation, the flow control element is subjected to forces and moments from the fluids. These fluid forces and moments are a function of fluid pressure and flow rate. Actuation forces and moments must therefore overcome the fluid forces and moments in order to allow control valves to modulate flow effectively. Control valves may greatly benefit from flow controlling elements, a valve ball for instance, configured to reduce the fluid forces and moments that the fluid exerts on the flow controlling element.

Inherent to conventional ball valve designs is a tendency for the ball to change position (i.e., "drift") when the ball is placed in some "throttled" position between fully open and fully closed. One way to overcome this tendency is to provide friction between the ball and a complementary mating surface of a valve housing or body, called a "seat," to maintain the valve ball in a desired position. Likewise, friction in a valve manual control handle assembly, and hydraulic forces internal to the valve ball, may be utilized to provide the valve assembly with the capability to maintain the valve ball position in select fluid-flow positions. In a properly functioning valve, the frictional forces are sufficient to resist the unbalanced hydraulic forces of the fluid. An exemplary design is set forth in U.S. Pat. No. 6,173,940 to Kardohely, et al.

The flow control element is also subjected to friction forces from other associated fixed or movable valve elements so that the friction forces resist the fluid forces and moments, allowing for stable control of the flow controlling element position upon actuation. These friction forces, however, also aid to define the required operating forces and moments for the valve and, if not optimized for a certain flow, may render the flow controlling element difficult if not impossible to operate. The solution is not simply to reduce friction in the valve, since reducing the friction would likely result in undesirable drifting of the ball position. There is thus a need for a ball valve that is easily adjustable, yet not having a tendency to drift.

SUMMARY

Flow controlling elements are disclosed according to various embodiments of the present invention. Several predetermined flow-controlling element shapes are configured to reduce the forces and moments exerted by a fluid on the flow controlling element, for instance a valve ball, in flow control valves. The reduction of forces and moments on the ball element in turn reduces the forces and moments required to position the flow controlling element during actuation, thereby reducing the magnitude of forces and moments that must be produced manually or by any other means to position the flow controlling element as desired and maintain that desired position for a required amount of time. This reduction in fluid forces and moments exerted on the flow controlling element allows the control valve to modulate higher flows.

One aspect of the present invention is a flow control valve element. The flow control valve element has a generally spherical ball. An inlet is formed in the ball. An outlet is also formed in the ball, the outlet opposing the inlet. A hollowed-out portion extends between the inlet and the outlet. A pair of opposing flats are formed in the ball, the flats each having a first flat portion formed in an external portion of the ball and an opposing second flat portion formed in the hollowed-out portion of the ball.

Another aspect of the present invention is a flow control valve element, comprising a generally spherical ball having an external surface. An inlet is formed in the ball. An outlet is also formed in the ball, the outlet opposing the inlet. A hollowed-out portion extends between the inlet and the outlet and has an interior surface. At least one of the external and internal surfaces has a surface finish reduction.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to identify like features in the various drawings. Furthermore, like symbols are used to identify like parameters in the various drawings.

I. FLOW CONTROLLING ELEMENTS TO REDUCE FLUID FORCES AND MOMENTS IN CONTROL VALVES

A conventional valve ball fluid flow controlling element (hereafter "conventional valve ball") 10 is shown in FIGS. 1A through 3C. Conventional valve ball 10 includes an inlet 12 and an opposing outlet 14, the inlet and outlet each having a lip 16, the lip having a flow passage edge 17, the flow passage edge being oriented generally parallel to a fluid flow direction when the valve ball element 100 is in an open position and having a predetermined width Lw1. Conventional valve ball 10 further includes a pair of opposing flats 18, the flats having an external flat portion 20 and an internal flat portion 22. Conventional valve ball 10 further includes a hollowed-out portion 24, and a wall formed between the internal and external portions of the ball, the wall having a predetermined thickness Wt proximate the inlet and the outlet. These features are summarized in Table 1 below, along with their controlling parameters.

TABLE 1

| Feature | Feature Ref. No. | Control Parameter | Parameter Symbol |
|---|---|---|---|
| Lip, Inlet and Outlet | 16 | Lip Width | Lw1 |
| External Flat Portion | 20 | External Flat Diameter | Def1 |
| Internal Flat Portion | 22 | Internal Flat Diameter | Dif1 |
| Hollowed-Out Portion | 24 | Internal Radius | R1 |

A. Increase in Valve Flow Control Capability

Figure 1A:
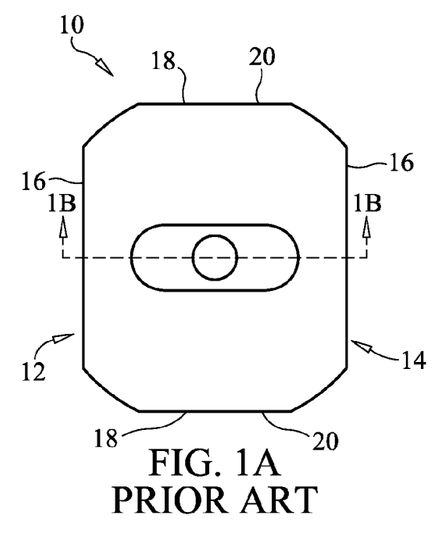
FIG. 1A is a side elevational view of a conventional flow control valve ball.
Figure 1B:
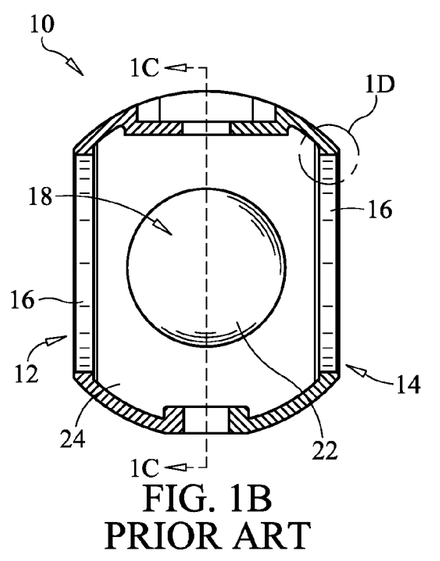
FIG. 1B is a view in section of the flow control valve ball of FIG. 1A, showing a flat of the flow control valve ball.
Figure 1C:
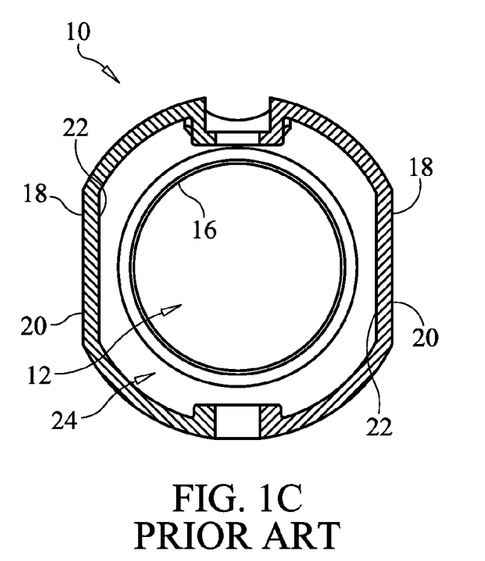
FIG. 1C is a view in section of the flow control valve ball of FIG. 1B, showing an inlet of the flow control valve ball.
Figure 1D:
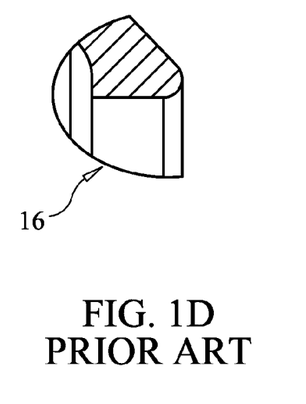
FIG. 1D is an enlarged partial view of a lip of the flow control valve ball of FIG. 1B.
Figure 2:
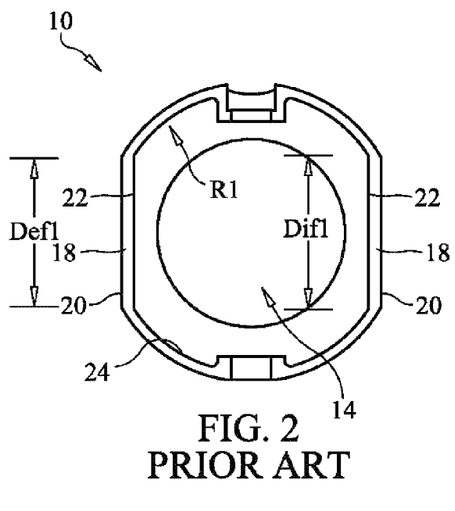
FIG. 2 is another view in section of the flow control valve ball of FIG. 1A, showing an outlet of the flow control valve ball.
Figure 3A:
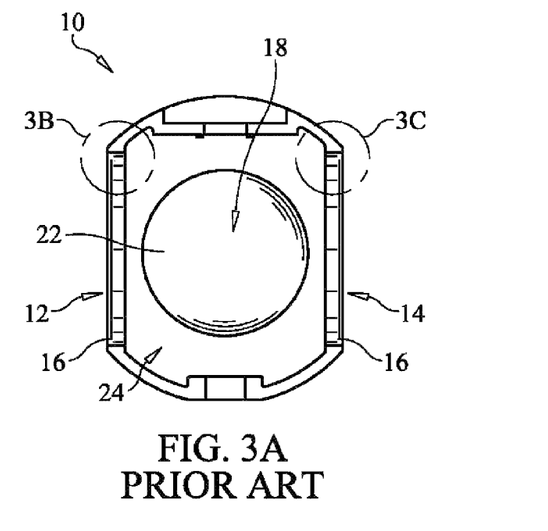
FIG. 3A is still another view in section of the flow control valve ball of FIG. 1A, showing a flat of the control valve ball.
Figure 3B:
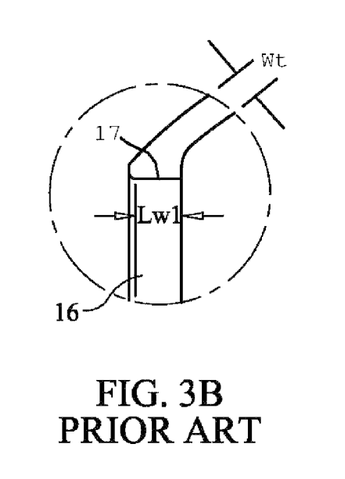
FIG. 3B is an enlarged partial view of an inlet lip of the flow control valve ball of FIG. 3A.
Figure 3C:
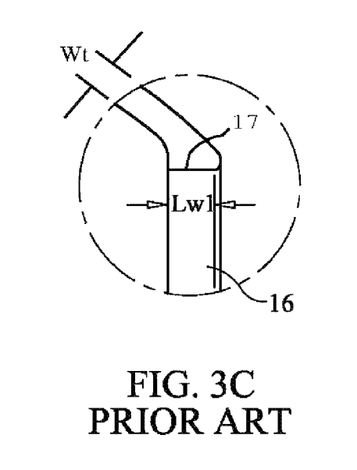
FIG. 3C is an enlarged partial view of an outlet lip of the flow control valve ball of FIG. 3A.
Figure 4A:
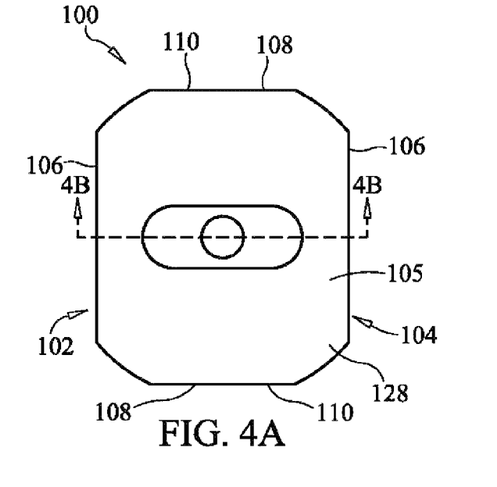
FIG. 4A is a side elevational view of a flow control valve ball element according to an embodiment of the present invention.
Figure 4B:
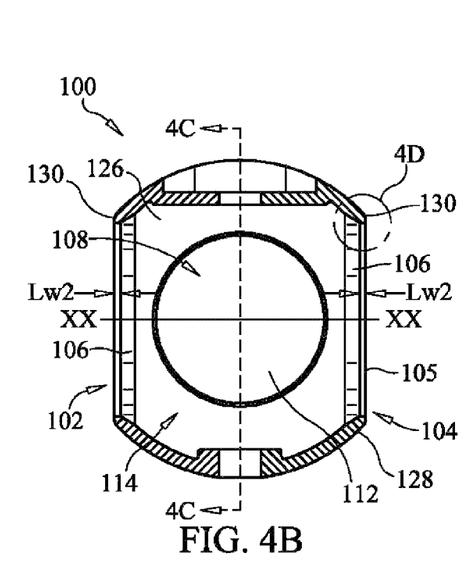
FIG. 4B is a view in section of the flow control valve ball element of FIG. 4A, showing a flat of the flow control valve ball element.
Figure 4C:
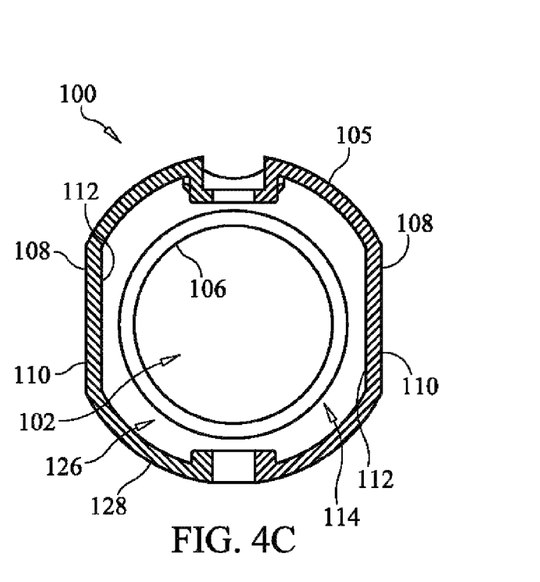
FIG. 4C is a view in section of the flow control valve ball element of FIG. 4B, showing an inlet of the flow control valve ball element.
Figure 4D:
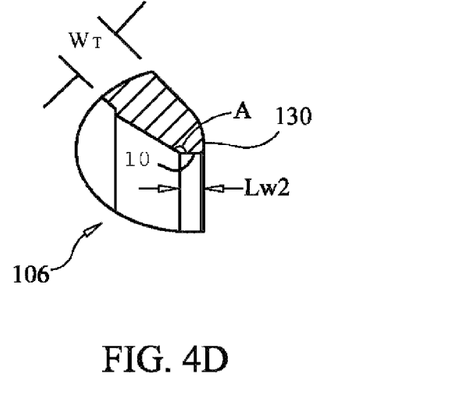
FIG. 4D is an enlarged partial view of a lip of the flow control valve ball element of FIG. 4B.
Figure 5:
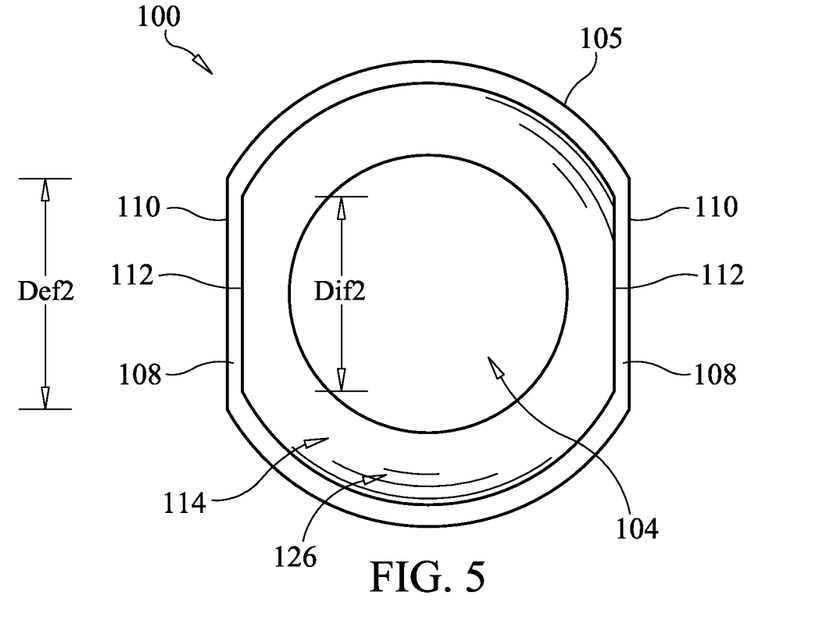
FIG. 5 is another view in section of the flow control valve ball of FIG. 4A, showing an outlet of the flow control valve ball.

A valve ball controlling element (hereafter "valve ball element") 100 is shown in FIGS. 4A through 5 according to an embodiment of the present invention. Valve ball element 100 includes an inlet 102 and an opposing outlet 104 formed in a generally spherical ball 105, the inlet and outlet each having a lip 106, the lip having a flow passage edge 107, the flow passage edge being oriented generally parallel to a fluid flow direction when the valve ball element 100 is in an open position and having a predetermined width Lw2. Valve ball element 100 further includes a pair of opposing flats 108, formed in the ball 105, the flats having an external flat portion 110 and an internal flat portion 112. Valve ball element 100 further includes a hollowed-out portion 114 in the ball 105, and a wall formed between the internal and external portions of the ball, the wall having a predetermined thickness $W_T$ proximate the inlet and the outlet. These features are summarized in Table 2 below, along with their controlling parameters.

TABLE 2

| Feature | Feature Ref. No. | Control Parameter | Parameter Symbol |
|---|---|---|---|
| Lip, Inlet and Outlet | 106 | Lip Width | Lw2 |
| External Flat Portion | 110 | External Flat Diameter | Def2 |
| Internal Flat Portion | 112 | Internal Flat Diameter | Dif2 |
| Hollowed-Out Portion | 114 | Internal Radius | R2 |

In one embodiment of the present invention enhanced throttling capability of valve ball element 100 is achieved by controlling parameters Def2 and Dif2 of either or both of the flats 108. In particular, for either or both flats 108 the diameter Def2 of external flat portion 110 is increased and/or the diameter Dif2 of internal flat portion 112 is reduced, or vice versa. Furthermore, ratios formed by the exterior dimension Def2 of external flat portion 110 and the internal dimension Dif2 of internal flat portion 112 may be used to describe the dimensions selected to increase the flow area at the seat openings, effectively decreasing flow through the ball and thus reducing hydraulic forces that can cause drift. The flat ratio may be described generally as follows, in Equation 1:

$$\text{Ratio} = \text{Def2}/\text{Dif2} \qquad \text{Equation 1}$$

In general, when external and internal flat portions 110, 112 respectively are generally circular in shape, the higher the ratio between diameter Def2 of external flat portion 110 and diameter Dif2 of internal flat portion 112, the better the flow controlling capability of the valve ball element 100. All ratios of Def2/Dif2, ranging from zero (i.e., no external flat portion 110 when Def2=0) to infinity (i.e., no internal flat portion 112 when Dif2=0) are within the scope of the present invention.

Figure 6:
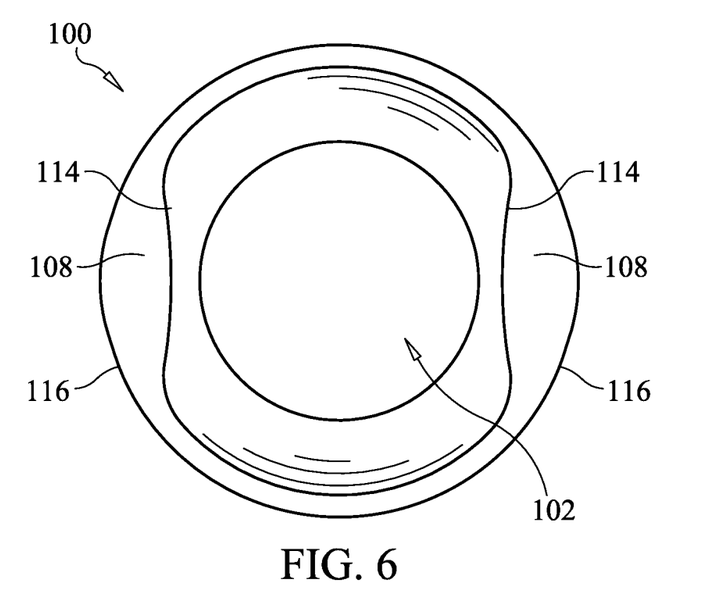
FIG. 6 shows examples of a flow control valve ball according to several alternate embodiments of the present invention.

In some embodiments of the present invention either or both of the flats 108 of valve ball element 100 may include a geometry wherein external flat portion 110 and internal flat portion 112 have a slight concave geometry 116 and a slight convex geometry 118 respectively, as shown in FIG. 6. In other embodiments of the present invention external flat portions 110 of valve ball element 100 may incorporate convex geometry 118 while internal flat portion 112 may incorporate concave geometry 116. In still other embodiments of valve ball element 100, for either of the flats 108, only one of external flat portion 110 and internal flat portion 112 of the flat may incorporate a concave or convex geometry 116, 118 respectively, the other flat being substantially planar. In yet other embodiments of valve ball element 100 either or both of the flats 108 may have only one external and internal flat portion 110, 112 respectively (or no flat portions) as opposed to two external and two internal flat portions.

B. Modification of the Spherical Hollowed-Out Shape to an Elliptical Shape

Figure 7:
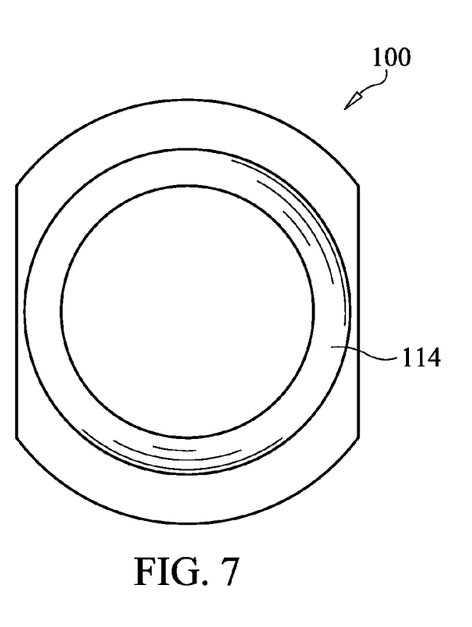
FIG. 7 shows a flow control valve ball according to yet another embodiment of the present invention.
Figure 8:
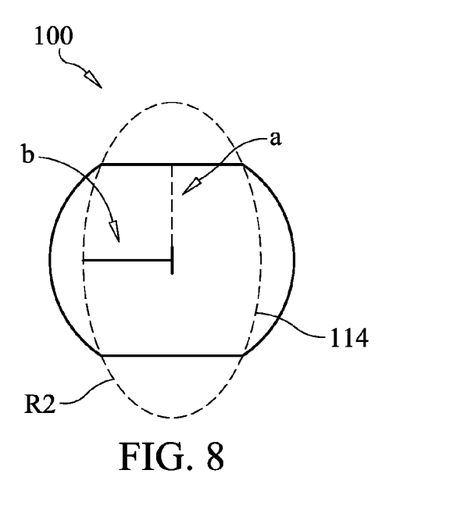
FIG. 8 shows further details of the flow control valve ball of FIG. 7.
Figure 9:
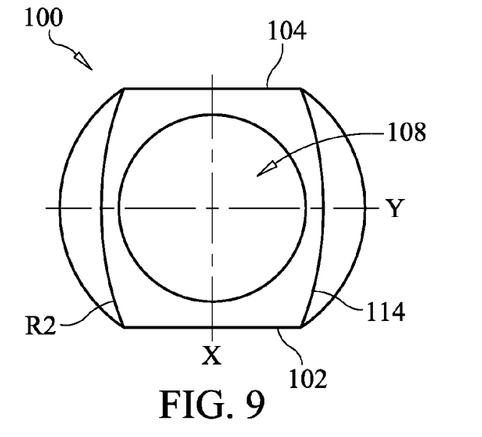
FIG. 9 illustrates parameters of a flow controlling element according to still another embodiment of the present invention.

With reference to FIGS. 7 and 8, valve ball element 100 may be configured with a hollowed-out portion 114 having a radius "R2" parameter that is defined by a set of major and minor axes "a" and "b" respectively as shown in FIG. 8. In general, the larger the minor axis length b with respect to the major axis a, the better the flow controlling capability of valve ball element 100. Stated another way, an elliptical hollowed-out portion 114 radius R2 may be envisioned as a material removal by revolving an ellipse around two axes of valve ball element 100, namely an axis "X" parallel to the flow and an axis "Y" perpendicular to the flow, as shown in FIG. 9. Radius R2 may be expressed by Equation 2, below:

$$R = Y/X \qquad \text{Equation 2}$$

FIGS. 7-9 illustrate an embodiment where the ellipse is revolved around axis X, parallel to the flow of fluid through valve ball element 100. In general, the higher the Y/X ratio (i.e., b/a ratio) of radius R2, the higher is the reduction in fluid forces and moments upon valve ball element 100. The present invention envisions all ratios of radius R2 ranging from approximately zero toward infinity, understanding that zero and infinity ratios cannot be materialized geometrically.

The present invention also includes all internal profiles of hollowed-out portion 114 that are convex with variable curvature. In contrast, conventional valve ball 10 has a convex shape with constant curvature R1 (FIG. 2) as in the case of a spherical hollowed-out shape. In addition, other valve balls in the art may have no curvature at all as, in the case of a "straight-through" hollowed-out shape.

Furthermore, the present invention includes concave shapes of hollowed-out portion 114 for a reduction in fluid forces and moments, as well as combinations of convex and concave shapes.

Valve ball element 100 may further include the same internal surfaces described above with through-holes positioned specifically to reduce the flow forces and moments.

All variations of ratio R2, axes of revolution and convex/concave shapes of hollowed-out portion 114 may be considered in combination with all the possible variations of the aspects of the present invention disclosed in section I.A above. Non-limiting example embodiments are shown in FIGS. 7, 8 and 9.

C. Inlet/Outlet Lip Width

Figure 10:
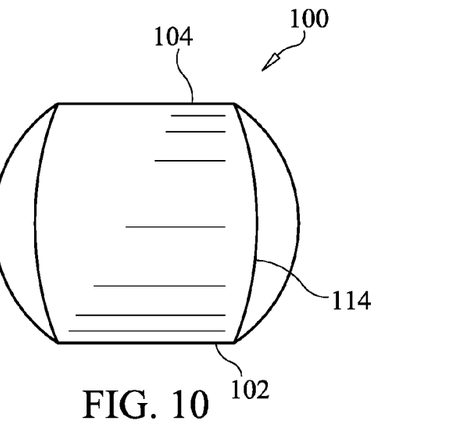
FIG. 10 shows a flow controlling element according to yet another embodiment of the present invention.

With reference to FIG. 4B, in general, the smaller the lip width parameter Lw2 of lips 106, the better the flow controlling capability of valve ball element 100. Thus, when width Lw2 is less than the wall thickness $W_T$, the flow controlling capability of the ball is improved. Similarly, valve ball element 100 may be configured with lips 106 oriented at an angle A with respect to a longitudinal axis XX (FIGS. 4B, 4D) to improve the flow controlling capability of the valve ball element. In some embodiments of the present invention valve ball element 100 may be configured without lips 106, as shown in FIG. 10. Note also that valve ball element 100 of FIG. 10 further includes an elliptical hollowed-out portion 112.

This aspect of the present invention in all its different variations may be considered with in combination with all the possible variations of the aspects of the present invention detailed in sections I.A and I.B above.

D. Waterway Structure

Figure 11:
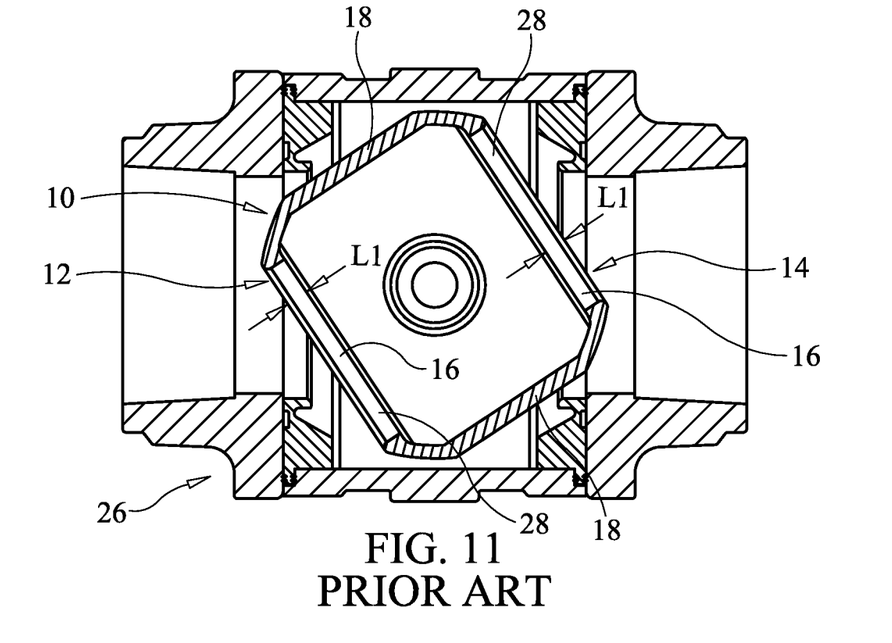
FIG. 11 is a view in section of a prior art valve assembly.

A valve body 26 having a conventional valve ball 10 rotatably disposed therein is shown in FIG. 11. A valve body 120 having a valve ball element 100 rotatably disposed therein is shown in FIG. 12.

Figure 12:
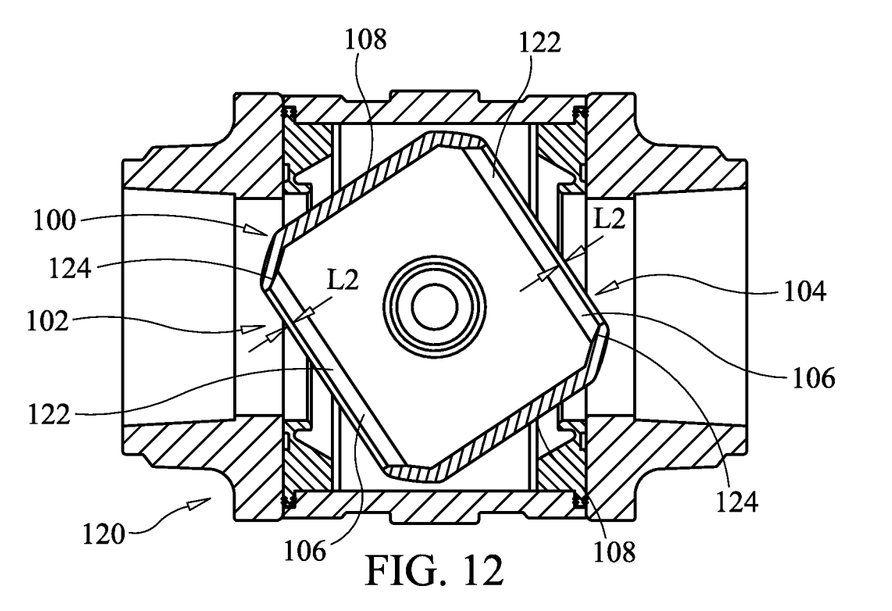
FIG. 12 is a view in section of a valve assembly according to yet another embodiment of the present invention.
Figure 13A:
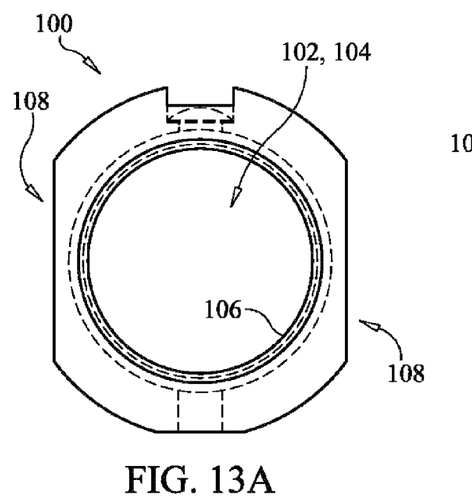
FIG. 13A is an end elevational view of a valve ball element according to another embodiment of the present invention.
Figure 13B:
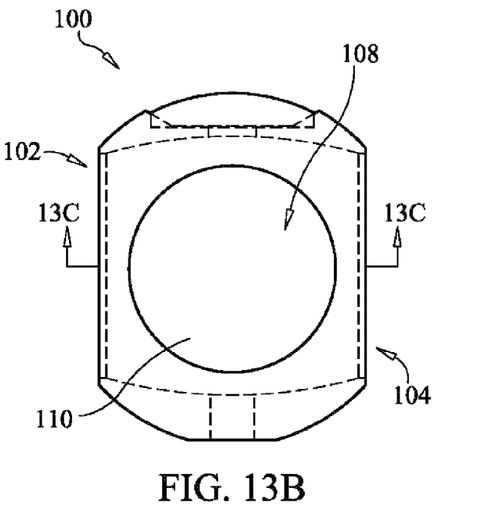
FIG. 13B is a side elevational view of the valve ball element of FIG. 13A.
Figure 13C:
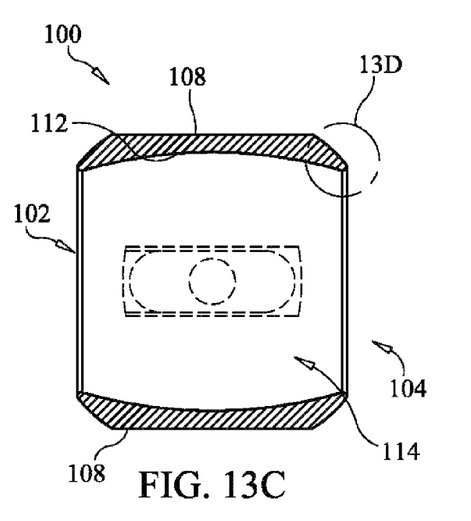
FIG. 13C is a view in section of the valve ball element of FIG. 13B.
Figure 13D:
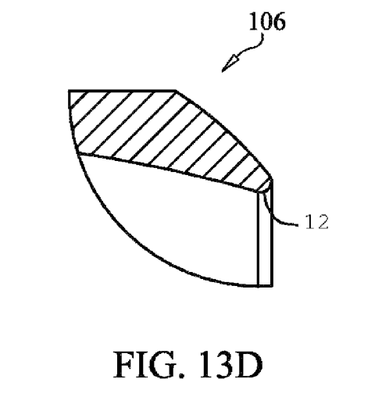
FIG. 13D is an enlarged partial view of a lip of the valve ball element of FIG. 13C.

With reference now to FIG. 11, inlet 12 and outlet 14 of conventional valve ball 10 each include a waterway 28 having a length "L1." Likewise, with reference to FIG. 12, inlet 102 and outlet 104 of valve ball element 100 each include a waterway 122 having a length L2. As can be seen by comparing FIGS. 11 and 12, waterway 122 is of reduced length as compared to waterway 28 of conventional valve ball 10. The reduced length L2 enhances the pressure distribution on interior surfaces of valve ball element 100 as compared to conventional valve ball 10.

Waterway 122 of either or both of inlet 102 and outlet 104 of valve ball element 100 may optionally include a chamfer 124, as shown in FIG. 12.

Views of valve ball element 100 are shown in FIG. 13 according to an alternate embodiment of the present invention. In this embodiment waterway length L2 is essentially zero, lip 106 includes a full radius flow passage edge 125 formed between the internal and external surfaces of the ball proximate the inlet and the outlet, thereby substantially eliminating waterway 122 and chamfer 124 altogether for enhanced pressure distribution about valve body element 100.

II. FLOW CONTROLLING ELEMENTS TO REDUCE FRICTION FORCES IN CONTROL VALVES

In the art, there are a number of features that determine the friction force acting upon a valve ball flow controlling element. It is desirable to reduce the friction forces from other fixed or movable valve elements so that operating forces and moments acting on the valve ball flow controlling element can be optimized. Preferably, flow controlling elements are configured so that fluid forces and moments are reduced. Reducing friction forces allows the design of flow controlling elements with higher flow controllability and along with lower operating forces and moments.

As detailed further below, the present invention discloses surface finishes and shapes for a flow controlling element, for instance a valve ball, configured to reduce friction forces from other fixed or movable valve elements in flow control valves. The reduction of friction forces on the ball element allow the valve to reduce the forces and moments required to position the flow controlling element during actuation, thereby reducing the magnitude of forces and moments that must be produced manually or by any other means to position the flow-controlling element and maintain that position for a required amount of time.

A. Decrease in Surface Finish

In general, the lower the surface finish roughness, the lower the friction between ball and seats during operation between closed position and multiple partially open positions. This is generally referred to as "break-away torque." Friction between the fully-closed and any partially open position is referred to as an "operating torque" and includes movement between two partially open positions.

Figure 14:
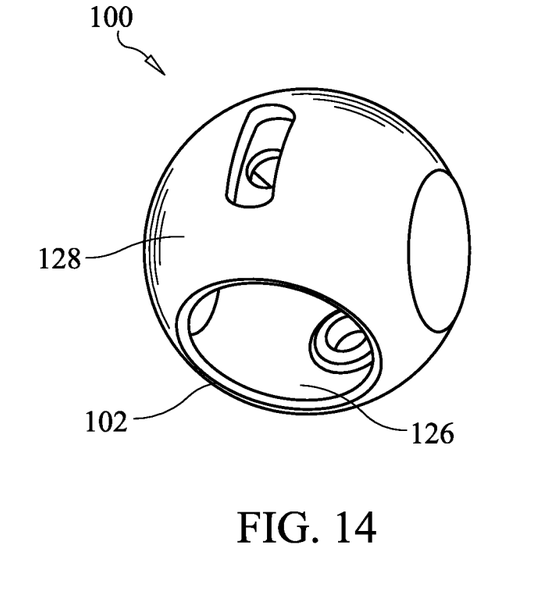
FIG. 14 is a view of a valve ball element according to still another embodiment of the present invention.

With reference to FIG. 14, in some embodiments of the present invention valve ball element 100 includes a predetermined surface finish of one or more surfaces of the valve ball element. The present invention is directed to reductions in surface finish that include but are not limited to, a surface finish reduction from about 120μ-inch to 32μ-inch.

The disclosed invention also addresses directional surface finishes of valve ball element 100, including internal surfaces 126 and external body surfaces 128, and oriented at a desired angle with respect to the fluid flow direction from inlet 102 to outlet 104 (i.e., axis X of FIG. 9). In some embodiments a directional surface finish is oriented parallel and/or perpendicular to the fluid flow direction, with any suitable finish values up to about 250μ-inch. Directional surface finishes may be utilized reduce friction forces acting upon valve body element 100 and to reduce flow forces and moments acting upon the valve body element.

This aspect of the present invention, in all its different variations regarding surface finish may be considered in combination with all the possible variations of aspects of the present invention detailed above in sections I.A, I.B, and I.C.

B. Increase Exterior Geometry Blend Radius

In general, The larger the exterior geometry blend radius, the lower the friction between a valve ball flow-controlling element and adjacent seats upon returning the ball to its closed position. This provides for easier movement of the ball past the valve seats, and thus reduced effort in operating the valve. This is generally referred to as the "re-seating torque."

With regard to valve ball element 100, a blend radius 130 may be employed, as shown in FIGS. 4B and 4D. As can be seen in the figures, a blend radius 130 may be intermediate an opening of inlet 102 and an external portion of ball 105. Likewise, a blend radius 130 may be intermediate an opening of outlet 104 and an external portion of ball 105. As may be appreciated, any or all (or none) of inlet 102 and outlet 104 may include a blend radius 130 in various embodiments of the present invention.

In some embodiments blend radius 130 ranges from about 1/16 inch to about 5/32 inch, though greater and lesser radii are within the scope of the invention.

This aspect of the present invention, in all its different variations regarding surface finish may be considered in combination with all the possible variations of aspects of the present invention detailed above in sections I.A, I.B, and I.C as well as section II.A.

III. CONCLUSION

The present invention comprises predetermined shapes of flow controlling elements used in control valves. In one embodiment, predetermined shapes of valve balls are used as flow control elements in control valves used to control water flow in the fire suppression industry, although the present invention may be utilized for any application and in any industry that uses a specific component as the flow controlling element. However, the present invention may be used to advantage with any control valves that use a flow controlling element. In addition the present invention may be used with any control valves that are operated manually or by any other means. The flow controlling elements may be sized to suit a particular application within the scope of the invention. Furthermore, any suitable materials may be selected for the flow controlling elements within the scope of the invention. Any manufacturing and/or assembly process now known or late invented may be employed to produce the flow controlling elements. The flow controlling elements may be utilized to control the flow of both liquids and gases.

While this invention has been shown and described with respect to a detailed embodiment thereof, it will be understood by those skilled in the art that changes in form and detail thereof may be made without departing from the scope of the claims of the invention.

What is claimed is:

1. A flow control valve element, comprising:
    a sphere-shaped valve ball;
    an inlet formed in the valve ball;
    an outlet formed in the valve ball, the outlet opposing the inlet, at least one of the inlet and the outlet comprising a lip, the lip comprising a flow passage edge, the flow passage edge disposed generally parallel to a fluid flow direction when the valve ball is disposed in a fully open position, the lip comprising a flow passage width which is less than a wall thickness dimension proximate one or more of the inlet and the outlet; and
    a hollowed-out portion extending between the inlet and the outlet, the hollowed-out portion defined by an ellipsoid segment of an ellipsoid comprising a first semi-principal axis, a second semi-principal axis, and a third semi-principal axis:
        the first semi-principal axis is greater than both the second semi-principal axis and the third semi-principal axis; and
        a path of fluid flow through the hollowed-out portion lies along the first semi-principal axis when the valve ball is disposed in a fully open position.

2. The flow control valve element of claim 1, comprising a pair of opposing flats formed in the valve ball, the flats respectively comprising a first flat portion disposed on an external portion of the valve ball and an opposing second flat portion disposed in the hollowed-out portion, the first and second flat portions defining a valve ball wall comprising a first thickness dimension.

3. The flow control valve element of claim 2, the diameter of the first flat portion is greater than the diameter of the second flat portion.

4. The flow control valve element of claim 2, the diameter of the second flat portion is greater than the diameter of the first flat portion.

5. The flow control valve element of claim 2, the first and second flats are circle-shaped.

6. The flow control valve element of claim 2, the first flat portion comprising one of:
    a convex topology; and
    a concave topology.

7. The flow control valve element of claim 2, the second flat portion comprising one of:
    a convex topology; and
    a concave topology.

8. The flow control valve element of claim 1, at least one of the inlet lip and the outlet lip comprising a blend radius, at least a portion of which is disposed in the flow path of the fluid flow through the hollowed-out portion.

9. The flow control valve element of claim 1, at least one of the inlet lip and the outlet lip formed by a chamfer between an interior surface of the hollowed-out portion and an exterior surface of the valve ball.

10. The flow control valve element of claim 1, the wall thickness dimension proximate one or more of the inlet and the outlet comprising a second thickness;
    the second thickness dimension is less than a first thickness dimension of a valve ball wall defined by the hollowed-out portion and the exterior surface of the valve ball; and
    the second thickness dimension is defined by a point where the hollowed-out portion meets the exterior sphere-shaped topology of the valve ball in combination with the blend radius.

11. A flow control valve element, comprising:
a sphere-shaped valve ball, the inlet comprising an inlet lip; an outlet formed in the valve ball, the outlet opposing the inlet, and comprising an outlet lip, at least one of the inlet lip and the outlet lip comprising a blend radius flow passage edge formed between an internal surface of a hollowed out portion and external surface of the valve ball, and at least one of the inlet lip and the outlet lip comprising a flow passage edge, the flow passage edge disposed generally parallel to the fluid flow when the valve ball is disposed in a fully open position, the flow passage edge comprising a second thickness dimension that is less than a first thickness dimension of a valve ball wall proximate to the at least one of the inlet lip and the outlet lip, the first thickness dimension defined by the hollowed-out portion and the exterior surface of the valve ball; and the hollowed-out portion
extending between the inlet and the outlet, the hollowed-out portion comprising an ellipsoid segment of an ellipsoid defined by rotating an ellipse about its semi-major axis:
the semi-major axis is greater than the semi-minor axis of the ellipse; and
the direction of flow through the valve ball lies along the semi-major axis when the valve ball is disposed in a fully open position.

12. The flow control valve element of claim 11, at least one of the inlet lip and the outlet lip formed by a chamfer the interior surface of the hollowed-out portion and the exterior surface of the valve ball.

13. The flow control valve element of claim 11, comprising a pair of opposing flats formed in the valve ball, the flats respectively comprising a first flat portion disposed on an external portion of the valve ball and an opposing second flat portion disposed in the hollowed-out portion, the first and second flat portions defining the valve ball wall comprising the first thickness dimension.

14. The flow control valve element of claim 11 wherein at least one of the external surface of the valve ball and the internal surface of the hollowed-out portion comprise a reduced roughness surface finish of about 120µ-inch.

15. The flow control valve element of claim 11 wherein at least one of the external surface of the valve ball and the internal surface of the hollowed-out portion comprise a directional surface finish oriented generally parallel to a fluid flow direction through the hollowed-out portion of the flow control valve element.

16. A flow control valve ball, comprising:
a generally spherically-shaped topology;
an inlet;
an outlet, the outlet opposing the inlet;
a hollowed-out portion extending between the inlet and the outlet, the hollowed-out portion defined by an ellipsoid segment of an ellipsoid comprising a first semi-principal axis, a second semi-principal axis, and a third semi-principal axis: the first semi-principal axis is greater than both the second semi-principal axis and the third semi-principal axis; and a path of fluid flow through the hollowed-out portion lies along the first semi-principal axis when the valve ball is disposed in a fully open position;
a pair of opposing flats, the flats respectively comprising a first flat portion formed in the external portion of the ball and an opposing second flat portion formed in the hollowed-out portion of the ball; and
a wall defined by the internal and external portions of the ball, the wall having a wall thickness dimension proximate one or more of the inlet and the outlet,
wherein at least one of the inlet and the outlet comprises a lip, the lip comprising a flow passage edge, the flow passage edge disposed generally parallel to a fluid flow direction when the valve ball is disposed in a fully open position, the lip comprising a flow passage width which is less than the wall thickness dimension proximate one or more of the inlet and the outlet.

* * * * *